Patented Oct. 1, 1929

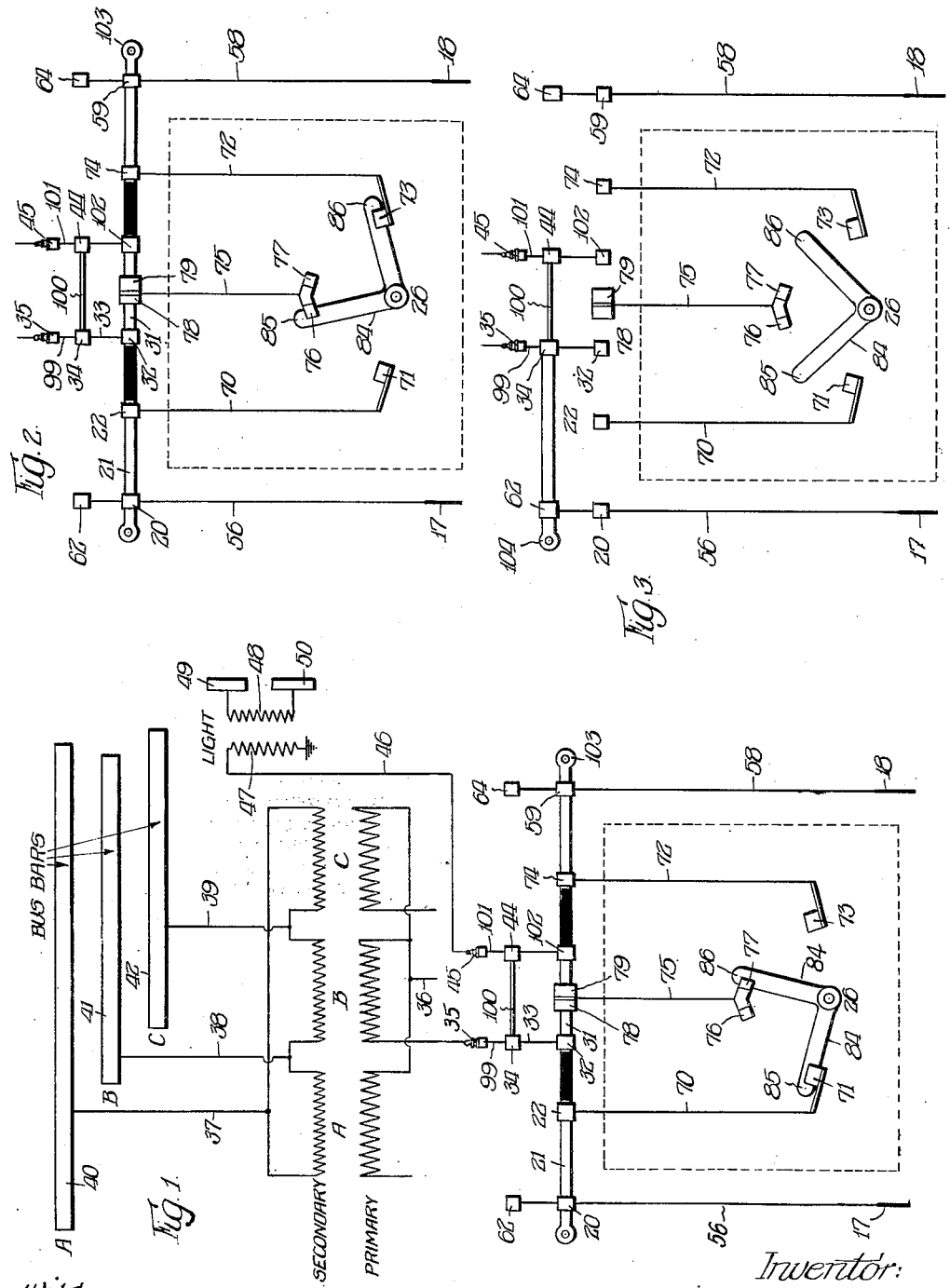

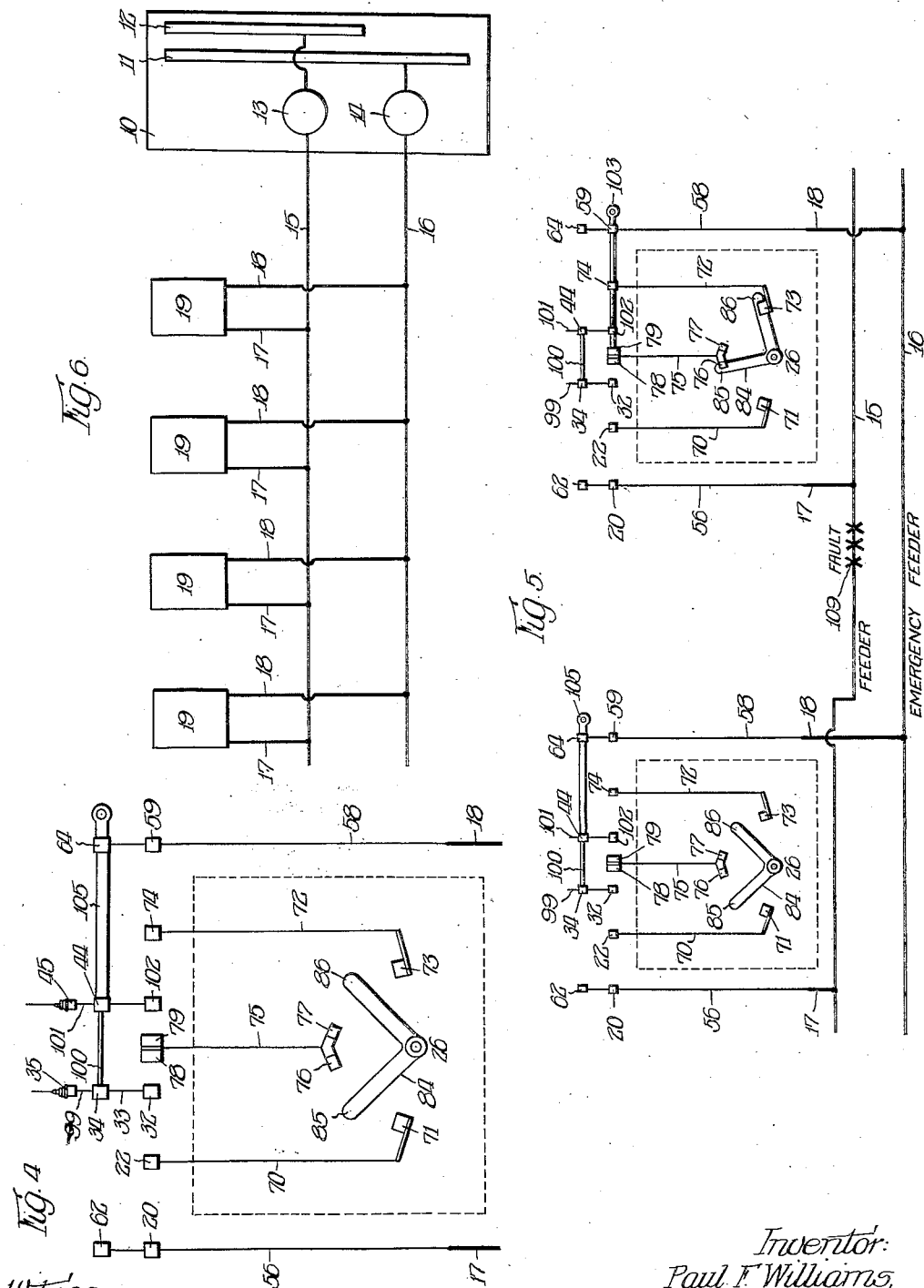

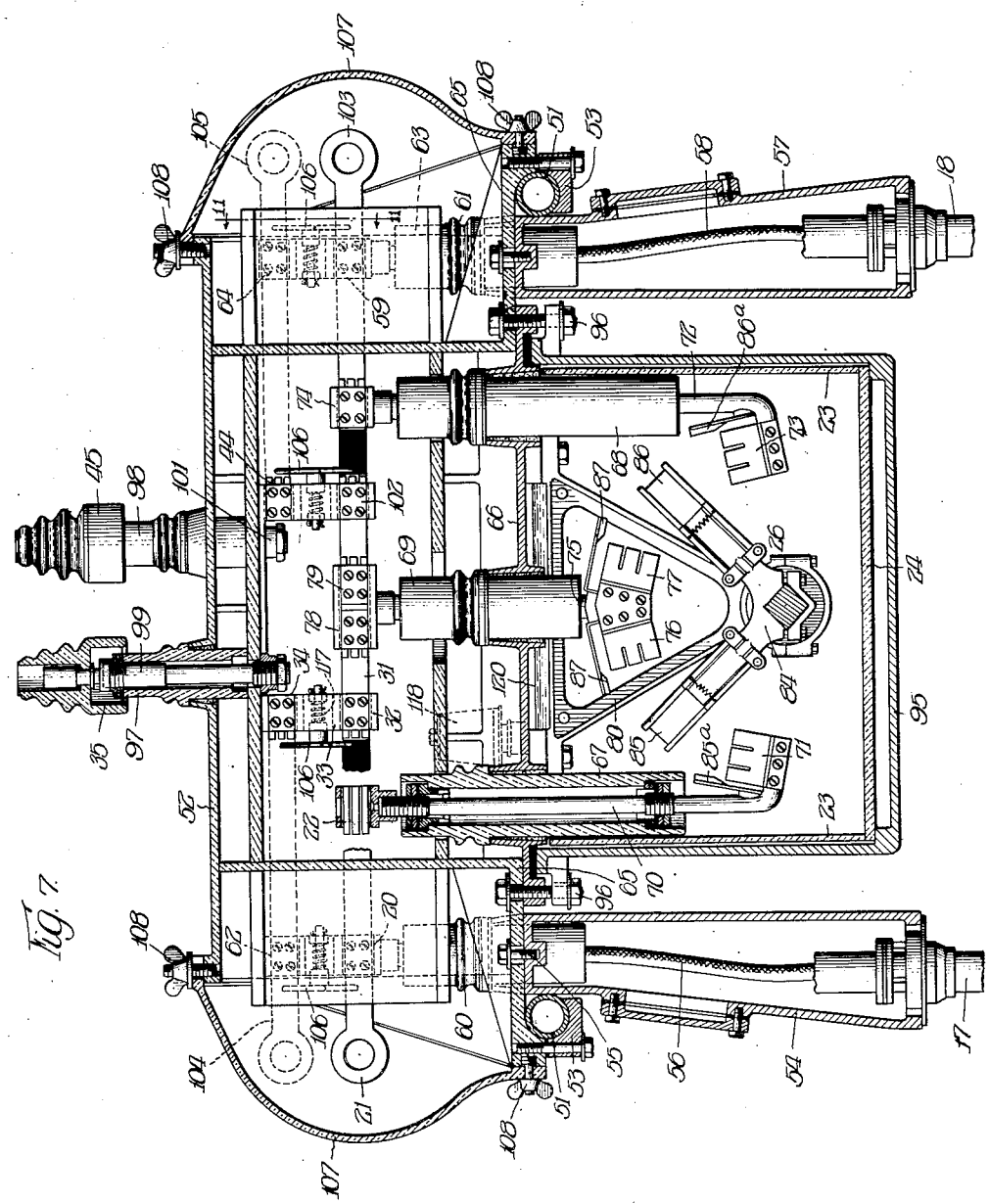

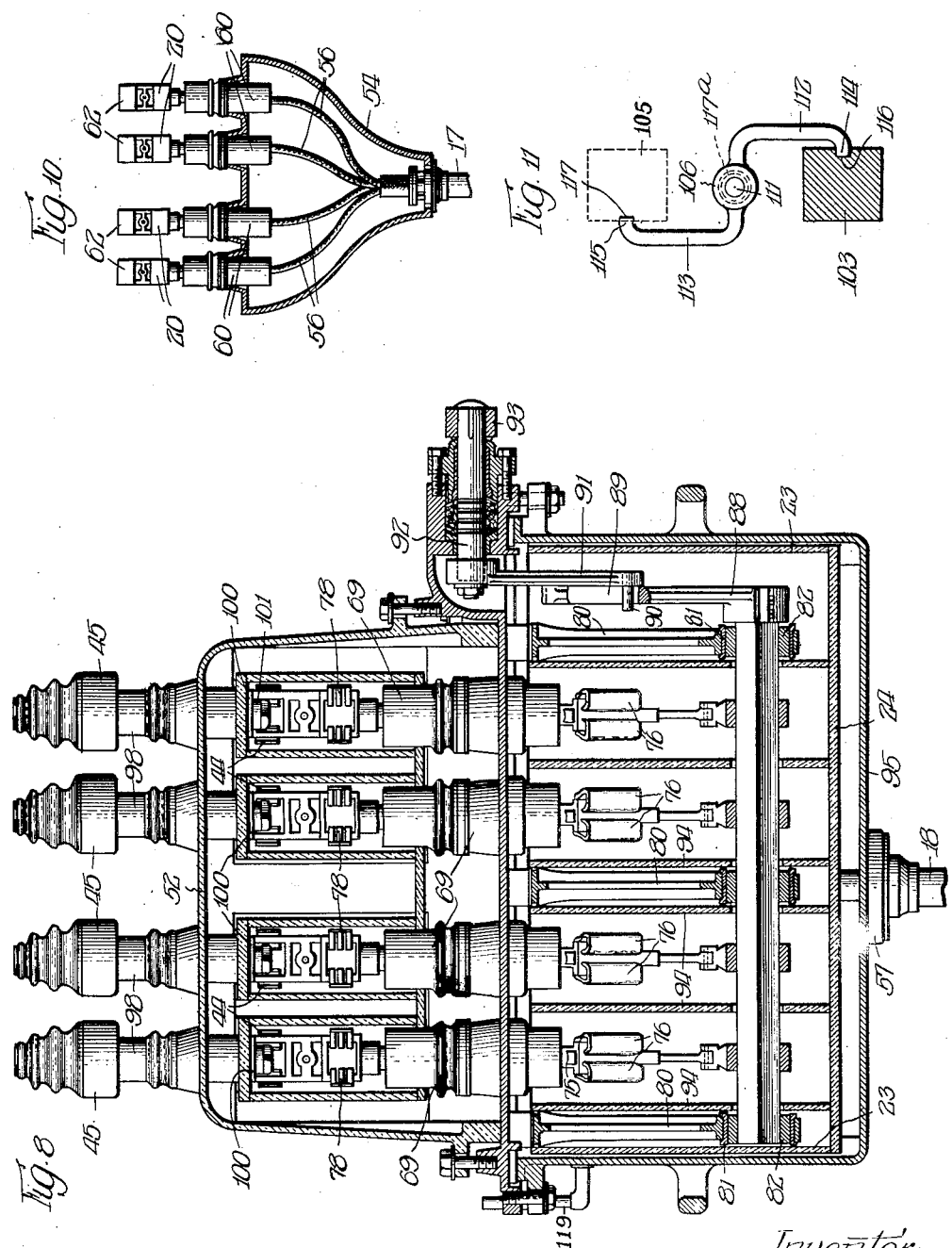

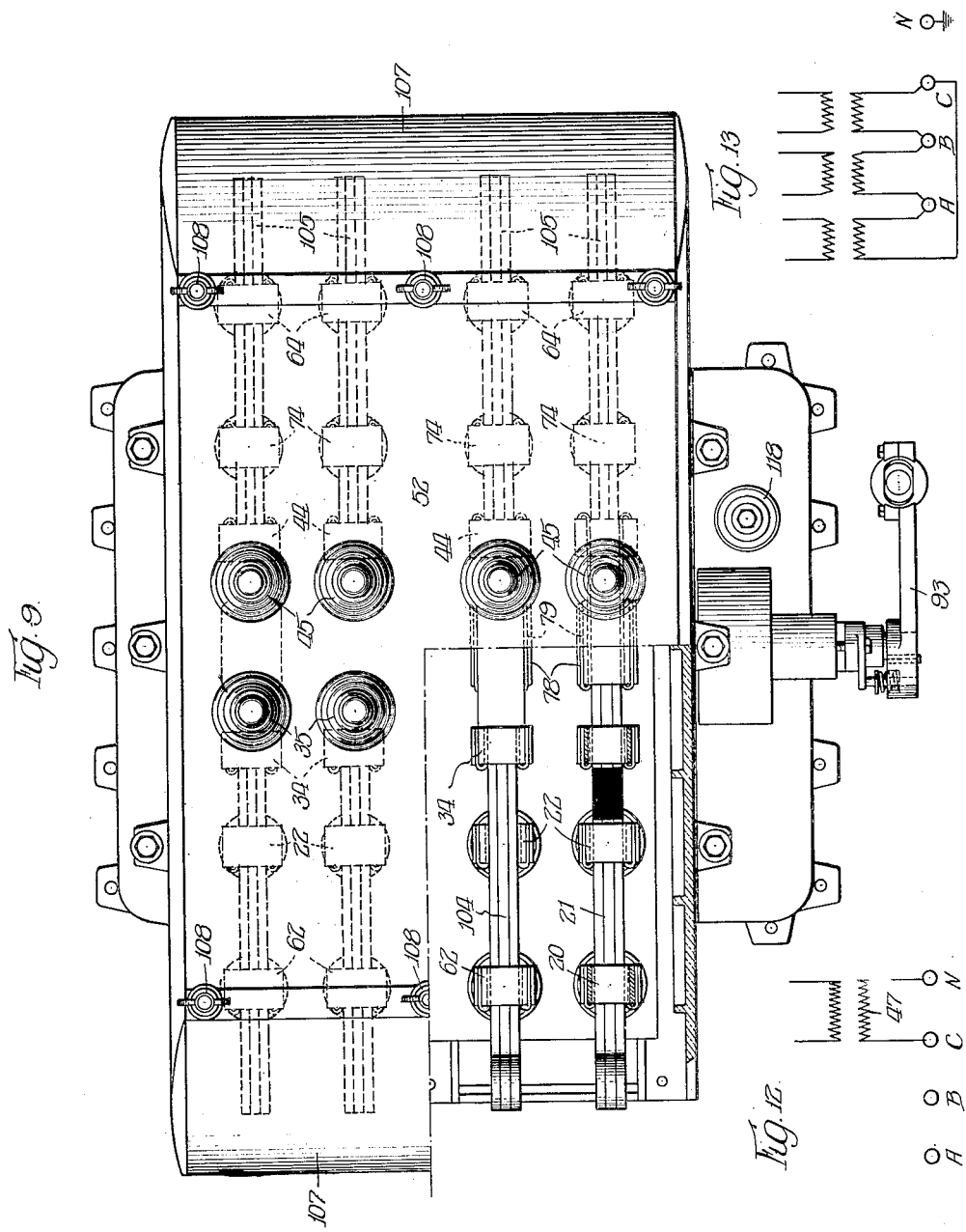

1,729,755

UNITED STATES PATENT OFFICE

PAUL F. WILLIAMS, OF CHICAGO, ILLINOIS, ASSIGNOR TO G. & W. ELECTRIC SPECIALTY CO., OF CHICAGO, ILLINOIS, A CORPORATION OF ILLINOIS

SYSTEM OF ELECTRICAL DISTRIBUTION AND CONTROL MEANS THEREFOR

Original application filed February 26, 1925, Serial No. 11,717. Divided and this application filed March 25, 1926. Serial No. 97,171.

My present invention relates to a system of electrical distribution and control means therefor, and this application is a division of my application, Serial No. 11,717, filed February 26, 1925.

In equipping buildings for electrical power and light purposes not only is a main feeder installed, but also a duplicate or emergency feeder is installed to meet all emergencies which are apt to arise. In such building installations usually a separate room or vault is provided in which the various electrical connections are made for service purposes. Heretofore if trouble has occurred in connection with the supply of electrical power and light to a building, it has been necessary, at times with great delay, to secure the services of an expert to go into the vault and, by a manipulation of a relatively large number of electrical connections, change over to the emergency feeder connections. Such an arrangement, although it has served well during the developing period of the past decade or so, not only is dangerous to life, but is not as satisfactory as it should be for many reasons, involving proper operation and service.

Accordingly one object of this invention is to improve electrical systems of distribution of power and light to a building, a group of buildings or a group of units of power and light distribution.

Another object is to improve the system for controlling circuit connections to meet all requirements arising in giving power and light service.

Another object is to provide a simple, compact, fool-proof and safe switching unit whereby all of the regular and emergency circuit connections may be readily made, broken and changed in accordance with requirements.

Another object is to provide a unitary control switch in which all of the parts cooperate in an improved manner to obtain the best results.

Another object is to provide an improved system of electrical distribution and control means therefor adapted to meet all of the known requirements demanded in supplying electrical power and light.

These and other objects are accomplished by means of the arrangement and mechanism shown on the accompanying sheets of drawings, in which Figure 1 is a schematic and diagrammatic view of a system of electrical distribution embodying my invention, it being appreciated that instead of showing all of the conductors connected to the various phases of the primary of the transformer, for the sake of clearness and simplicity but one conductor is shown as connected to the primary, and likewise but a single conductor is shown in the circuit connections through the main unitary control switch. This figure further illustrates, as will be pointed out more in detail hereinafter, normal service connections from the regular feeder through the unitary control switch, transformers and bus bars in the system.

Figure 2 is a similar, less elaborate, schematic and diagrammatic view showing connections through the main control switch when the regular feeder is not in use and the emergency feeder is in use, the transformers and bus bars being omitted, as they also will be omitted in other diagrammatic figures.

Figure 3 is a similar schematic and diagrammatic view in which the main control switch is in an open position and current is supplied from the main feeder through a secondary link switch to the power and light disconnect plugs leading to the primaries of the transformers.

Figure 4 is a similar schematic and diagrammatic view showing the main control switch in an open position and current being supplied from the emergency feeder through another secondary link switch to the electrical disconnect plugs.

Figure 5 is a schematic and diagrammatic view of a part of a system of distribution showing the application of two of my control switch units to overcome trouble which has occurred; for example on the main feeder between two customers, one of the main control switches being shown open and current being supplied from the auxiliary feeder through a secondary switch link connected to the service circuit, the other main switch being closed for completing a connection through the emergency feeder and through one of the secondary switch links, in turn electrically connected to an associated service circuit.

Figure 6 is a diagrammatic view of a system of electrical distribution including a sub-station and connection to a number of customers, it being appreciated, of course, that the customers may be supplied in a large number of different ways and various other combinations of circuit connections.

Figure 7 is a vertical cross-sectional view taken through my unitary control switch.

Figure 8 is a vertical longitudinal sectional view taken through the same switch at right angles to the section shown in Figure 7.

Figure 9 is a top plan view, part of the cover being broken away and some parts being shown in section, of the same unitary control switch.

Figure 10 is a fragmentary detail view showing one of the potheads for the feeder and contacts associated therewith, said pothead and contact forming a part of the switch structure.

Figure 11 is a detail sectional view taken in the plane of line 11—11 of Figure 7, showing an interlock between two of the link switch members, and Figure 12 and 13 are diagrams of transformer connections which may be made, broken and changed by use of the disconnect plugs on top of the switch casing for balancing loads, etc., on the different phases.

The various novel features of the invention will be apparent from the following description and drawings, and will be particularly pointed out in the appended claims.

Referring to the figures of the drawings, and more particularly first to Figure 6, it will be noted that the invention is illustrated in connection with a system of electrical distribution wherein a sub-station 10 is shown having bus bars 11 and 12, which are respectively connected through suitable switches 13 and 14 to a main feeder 15 and an auxiliary feeder 16. It will be understood that each of the feeders 15 and 16 includes two, three, four or more separate conductors, as conditions may require, insulated from each other, as do each of the branch main feeders 17 and branch emergency feeders 18 which extend from the feeders 15 and 16 respectively to the customers 19. Let it be assumed, as a matter of illustration, that each customer 19 is a large building requiring continuous power and light. As indicated hereinabove, in each of such building installations, usually a separate room or vault is provided in which the various electrical connections are made for service purposes. In each of said vaults or rooms the equipment illustrated diagrammatically in Figures 1 to 4 inclusive is installed.

Referring now more particularly to Figure 1 of the drawings, it will be noted that the main feeder 17 is shown as having one of its four conductors 56 connected to a switch contact 20 which is electrically connected through a link switch 21 to another contact 22 connected by conductor 70 to a contact 71 of the main switch. Contact 71 in turn is electrically connected to contact 85 on one of the switch arms 84 of the oil switch 26, the other arm 84 of the switch contacting through contact 86 with the stationary contact 77, in turn connected to the conductor 75, the circuit further including double stationary contacts 78 and 79, switch segment 31, contact 32, connection 33 to one terminal 34 of an electrical disconnect plug, the movable member of which is shown at 35. To this disconnect plug member 35 is an electrical connection to one phase B of the power primary transformer winding. It will be understood that connections similar to the one just described, from the feeder 17 to the other windings A and C of the primary transformer, will be made through the similar duplicate switch members, there being four insulated conductors in the feeder 17, three of which are connected to the primary of the power transformer and one of which is the neutral connection, the neutral being connected to the primary of the transformer as at 36. The secondary windings of the transformer are connected by conductors 37, 38 and 39 to bus bars 40, 41 and 42 respectively, from which connections may be tapped off for supplying power to the building.

For supplying light to the building the same switch connections are employed, the lighting circuit being completed from contact 34 through conductor 100, terminal 101 forming the stationary element of a disconnect plug, the plug member 45 of which is connected by a conductor 46 to a lighting transformer, the grounded primary winding of which is shown at 47. The secondary winding 48 is connected to bus bars 49 and 50, from which lighting connections may be tapped. Only one phase connection has been shown in the lighting circuit, but it will be appreciated that there are two other phases and that one or more of the phases may be used. Any one of the phases may be used alone, or two or three used at the same time, the one thing to be borne in mind is that the load on the various phases can be maintained in a balanced condition by manipulation of the four disconnect plugs 45 shown particularly in Figures 7, 8 and 9. It will be understood that one of the disconnects 45 is a neutral connection. As shown in Figure 1, the transformer windings 47 and 48 are shown, for example, for supplying a 110 volt circuit on the secondary side. The same point is further illustrated in Figure 12, wherein the primary winding 47 is shown as connected between neutral (N) and one phase (C). By means of the disconnect plugs 45, these connections may be changed so that the transformer winding 47 is connected between neutral and phase (B), or neutral and phase (A), for supplying current to the primary winding 47, causing an induced current on the secondary for 110 volts. In this same connection, attention is directed to Figure 13, in which the neutral is not employed. By means of the disconnect plugs 45, any one of the three phases may be used singly or any combination of two may be used, or of three may be used, for the purpose of balancing the load on the different phases.

The connections as described and shown in the diagram in Figure 1 are the normal connections when current is being supplied from the main feeder 17. Without considering further other diagrams of connection at this point, attention is directed to Figures 7, 8 and 9, which show the unitary switch mechanism which controls the connections in a given unit, and which is mounted in a building vault where there is a building installation.

The unitary switch mechanism is mounted upon two longitudinally-extending pipes or supports 51, to which the flanges 65 of the cover portion 52 of the switch are secured. Preferably this cover member 52 is secured to the supports 51 by clamps 53. One pothead 54, which extends along one side of the switch structure, is removably secured to the flange 65 of the cover 52 by screws 55. The main feeder 17 enters the lower end of the pothead 54, and the four conductors 56 spread out from said feeder and extend through said pothead 54 and respectively are electrically connected to their respective contacts 20, as shown somewhat diagrammatically in Figure 10. Similarly another pothead 57 is secured to another flange 65 of the cover 52 along the opposite side of the switch, said pothead receiving the emergency feeder 18, from which the four conductors 58 branch and are electrically connected respectively to contacts 59. Each of the contacts 20 is supported upon a separate porcelain bushing 60, and each of the contacts 59 is supported upon other porcelain bushings 61. In addition to each porcelain bushing 60 supporting a contact 20, it supports a second superimposed contact 62 which is permanently in electrical connection with its associated contact 20. Likewise each porcelain bushing 63 not only supports a contact 59 but also supports an associated superimposed contact 64, which is permanently electrically connected to the contact 59.

Also secured to the flanges 65 of the cover 52 is a central supporting plate 66, which carries four aligned porcelain bushings 67, four other aligned porcelain bushings 68 and four other aligned porcelain bushings 69. Extending through each of the porcelain bushings 67 is a conductor 70 terminating in the stationary switch contact 71, it being understood that there are four of such stationary contacts in alignment longitudinally of the switch structure, one switch for each phase and one for neutral. The upper end of each of the four conductors 70 is in electrical engagement with its associated contact 22. Likewise there is a conductor 72 extending through each of the four porcelain bushings 68 and each terminates in a stationary contact 73, there being four such stationary contacts 73 in alignment with each other longitudinally of the switch and on the side opposite the switch contacts 71. The upper end of each conductor 72 is in electrical engagement with its associated contact 74. A separate conductor 75 extends one through each of the porcelain bushings 69 and at its lower end is electrically connected to double switch members 76 and 77, it being understood that there are four such double switch members 76 and 77 in longitudinal alignment corresponding to the four switch members 71 and 73. The upper end of each of the four conductors 75 is electrically connected to the double switch contacts 78 and 79, there being four of such double switch contacts in longitudinal alignment, one for each phase and one for the neutral. Supported by and independently connected to the support member 66 are three spider structures 80 having bearings 81 in their lower portions for the reception of collars 82 mounted upon a longitudinally-extending squared shaft 83, which shaft is supported in the three spider structures 80. Carried by the shaft 83 are four double switch arms designated generally by reference characters 84, which arms are adapted to be rotated with the shaft 83 for making electrical connections between switch members 71 and 77 when said switch arms are in one position, and for making electrical connections between the contacts 73 and 76 when the switch arms 84 are rotated into their extreme opposite position. As shown in Figure 7 of the drawings, the switch arms 84 are in open position. It will be understood that suitable switch contact members 85 and 86 are carried at the ends of the switch arms 84 and that associated arcing tips 85$^a$ and 86$^a$ are used to prevent burning of the switch contacts 71 and 85 when they are drawn out of engagement with each other and to prevent burning of the contacts 73 and 86 when they are drawn out of engagement with each other. Likewise, similar arcing tips 87 are provided adjacent the switch contacts 76 and 77. In connection with the rotation of the switch arms 84 it will be noted that at one end of the shaft 83 a lever 88 is provided having a slot 89 in which a pin 90, secured to the lower end of another arm 91, rides. The arm 91 is secured to one end of the shaft 92, which extends through a properly bushed housing, the other end of the shaft having secured thereto an operating handle 93. Accordingly, when the handle 93 is rotated in one direction, one set of connections is made, and when rotated in the opposite direction another set of connections is made. The four sets of switch contacts supported by and below the frame member 66 are separated and housed by suitable insulating walls 94 which are fixed in place in any suitable manner. Also supported by and separably connected to the flanges 63 of the cover 52 is an oil tank 95 containing oil, in which the various contacts, such as 71, 73, 85, 86, 76 and 77 are immersed. The tank supports four walls 23 and a floor 24 of insulating material surrounding the switches. Accordingly it will be appreciated that if for any reason it is desired to inspect or repair any of the switch parts just described, the same can be easily and simply done by loosening the bolt and nut connections 96 and lowering the tank 95.

The upper part of the switch cover 52 supports four aligned porcelain bushings 97 and four other aligned porcelain bushings 98, together with conductors extending therethrough. Extending through each of the porcelain bushings 97 is a conductor 99 which forms one member of each of the power disconnect plugs. The upper end of each conductor 99 is adapted to be separately connected to the associated disconnect plug member 35 and the lower end of each is electrically connected to the conducting bar 100, electrically connected at one end to contacts 34 and 32. Likewise a conductor 101 extends through each of the porcelain bushings 98 and is adapted to be connected at its upper end to an associated lighting disconnect plug 45 and at its lower end electrically connected to the same conducting bar 100. The opposite end of the conducting bar 100 is electrically connected to contacts 44 and 102. A link switch member 103, having proper segment strips thereon as shown, is adapted to electrically connect the switch contacts 59 and 74, and other proper segment strips on said bar are adapted to electrically connect contacts 79 and 102. It will be understood that there are four of such switch links 103 on the righthand side of the switch, as shown in Figure 7, and likewise there are four similar switch links 21 at the lefthand side of said switch, as shown in Figure 7. In addition to the switch links 21 and 103, four similar switch links 104 may be used, as will be pointed out hereinafter, for connecting the switch contacts 62 and 34, and likewise another series of four similar switch links 105 may be used, in a manner to be described later, for connecting the contacts 44 and 64. Here again it will be appreciated that each set of switch links includes four, one for each phase and one for the neutral connections. For safety purposes the switch links 21 are interlocked with the switch links 104 and switch links 103 are interlocked with switch links 105, so that burning of associated switch contacts and creating other disturbances, as will be pointed out hereinafter, are overcome.

The interlock in each case takes the form of two members 106, both of which cooperate with the associated switch links, for example switch links 103 and 105 (see Figs. 7 and 11). One of the interlocks is located adjacent the outer associated contacts, such for example as contacts 59 and 64 respectively, and the other interlock is mounted adjacent two other cooperating contacts, for example, 102 and 44, as shown particularly in Figure 7. Referring for the moment to Figure 11, it will be noted that each interlock 106 takes the form of oppositely-extending arms 112 and 113 having inwardly-extending projections 114 and 115 respectively. As shown in said figure, the projection 114 occupies a slot 116 in the switch link 103 for locking said link in circuit-closing position. A spring 117ª wrapped around the pivot pin 111 of the interlock yieldably holds the interlocked in such locking position. It will be understood that when the upper link 105 is moved toward a closing position that the projection 114 will be moved out of the slot 116 for freeing the switch link 103, whereby the latter may be withdrawn. Referring now more particularly to Figure 7, it is to be understood that when the switch link 103, for example, is in closed position as it is shown, the righthand interlock 106 is effective for locking the link 103 in its closed position. The lefthand interlock 106, associated with contacts 102 and 44, is held in a position by switch link 103, whereby the upper switch link 105 is free to move into its closed position. From the above it is seen that when the upper switch link 105 is pressed toward its closed position the lower switch link 103 is unlocked so that it may be moved into open position and as soon as the upper switch links 105 has moved to closed position and the lower switch link 103 is moved toward open position the inner interlock 106, associated with the contacts 102 and 104, becomes effective for locking the upper switch link 105 in closed position. In this connection the projection 115 on the interlock arm 113 moves into a similar opening 117 in the upper switch link. In this way the operator is protected against accidental opening of one of the switches before the other is closed. To house the switch links 21, 104, 103 and 105 against accidental operation of same, removable side housing members 107 are provided which may be secured to the cover member 52, at a plurality of places, by thumb screws 108.

Under normal operating conditions, the main control switch 26, which is operated by movement of the shaft 83, is thrown to the left, as shown in Figure 1, so that the contacts 85 are in engagement with contacts 71 and contacts 86 in engagement with 77. The diagram of connections under such circumstances are shown in Figure 1 and have been described. A brief résumé of these connections shows that current is supplied to the power and light transformers from feeder 17 through conductors 56, contacts 20, switch links 21, contacts 22, conductors 70, contacts 71, 85, switch arms 84, contacts 86, 77, conductors 75, contacts 78, another portion of switch links 21, contacts 31, 32, connection 33, contact 34, bar 100, conductors 99 and 101, and power disconnect plugs 35 and light disconnect plugs 45. A branch circuit also exists from conductor 75 through contacts 79, a portion of link switches 103, contacts 102 and 44 to conducting bar 100 leading to conductors 99 and 101. In this way current is supplied to the power and light transfomers under normal operating conditions.

Let it be assumed, however, that the main feeder or some of the associated parts have become incapacitated. Under such circumstances the emergency feeder 18 may be used and without altering any other switch connections and without interrupting service, the main control switch 26 may be thrown to an extreme right position, as shown in Figure 7, for connecting contacts 86 and 73 and connecting contacts 85 and 76. When such connections are made as shown diagrammatically in Figure 2 and as also may be followed out in Figure 7, current is supplied from the emergency feeder 18 through as many of the four conductors 58 as may be desired and through contacts 59, portions of link switches 103, contacts 74, conductors 72, contacts 73 and 86, switch arms 84, contacts 85 and 76, conductors 75 to contacts 78 and 79, from which the circuits are completed, as described in connection with the normal circuits.

Now let it be assumed that the main control oil switch has become incapacitated or needs inspection and for that reason is not to to be used, but nevertheless continued service is required from the main feeder 17. Under such circumstances the links 104 are to be placed in electrical contact with the contacts 62 and 34, as shown in dotted lines in Figure 7, and as shown in the diagram of Figure 3. After the switch links 104 are placed in the circuit, switch links 21 are withdrawn, as is permitted by the interlocks 106 only after the switch links 104 are in position. When the switch links 21 are withdrawn, it will be understood that the circuit connections to the main control switch are entirely broken and are safe for inspection. With the connections thus made, as shown in the diagram of Figure 3, reference also being had to Figure 7, current will be supplied from the main feeder 17 through the four conductors 56, contacts 20 and 62, switch links 104, contacts 34 to the disconnect plugs 35 and 45.

Let it be assumed that the main feeder 17 is incapacitated and also that the main control switch is incapacitated or requires inspection and that continued service is demanded. Current may then be supplied from the emergency feeder 18. In order that such may be done, the links 105 may be placed in electrical engagement with their associated contacts 64 and 44, whereupon the links 103 may be withdrawn due to the position of interlock members 106. With the switch links 103 thus removed and with the switch links 105 in a circuit, current will be supplied from the emergency feeder 18 through the conductors 58, contacts 59 and 64, switch links 105, contacts 44, bar 100, to the power and light disconnect plugs 35 and 45 as shown in diagram of Figure 4.

Now let it be assumed that some trouble has arisen on the main feeder 15 as at the point 109 (see Figure 5) between, for example, two building installations, and that continued service is required in said buildings. This emergency can be taken care of in a manner as outlined in the diagram of Figure 5, wherein it will be noted that the arms 84 of the lefthand main control oil switch are in open position and the arms 84 of the righthand main oil switch are rotated to the right for completing the circuit at the contacts 73 and 86 and the contacts 85 and 76. Under such circumstances current for power and light purposes will be furnished to both customers through the section of emergency feeder 16 extending between the two customers, as shown in diagram of Figure 5. Following the circuit thus established for the lefthand customer indicated, it will be noted that the current flows from the auxiliary feeder 16 through branch feeder portion 18, conductors 58, contacts 59 and 64, switch links 105, contact 44, and conducting bar 100 to the service circuit including conductors 99 and 101. In this connection it will be noted that the switch link 104 has been withdrawn. For the righthand customer, the current flows from emergency feeder 16 through emergency feeder portion 18, conductors 58, contacts 59, switch links 103, contacts 74, conductors 72, switch contacts 73 and 86, switch arms 84, switch contacts 85 and 76, conductors 75, contacts 78 and 79, another portion of switch links 103, contacts 102 and 44, and bars 100 to the associated service circuit, including conductors 99 and 101. It is seen, therefore, that even though trouble may develop on the main feeder between two customers, by means of my improved control switch, current may be fed around the trouble to the second customer in what may be called a backfeed connection.

If at the same time the oil control switch on the righthand becomes incapacitated for any reason, current supply could be passed around said switch in the manner as described in connection with the lefthand customer shown in the diagram of Figure 5.

Any suitable relief valve 118 is provided in the frame member 66 which acts as a cover for the oil tank 95. This relief valve is for the purpose of relieving the oil tank of any excess pressure resulting from the formation of gas occasioned by opening of the circuits. An oil gauge 119 is provided for the tank 95, whereby the level of the oil therein may be seen. As shown in Figure 7, the oil level is indicated at 120.

By means of this system of electrical distribution and control means therefor, it is possible to meet all of the known requirements demanded in supplying electrical power and light..

In interpreting the expression "service circuit" in the claims, reference is had to the power circuit or light circuit, or both, for example at the disconnect plugs 35 and 45.

It is my intention to cover all modifications of the invention falling within the spirit and scope of the following claims.

I claim:

1. In control mechanism for a system of distribution, the combination of a casing, circuit controlling switch mechanism mounted in said casing, a pothead removably secured to said casing, and a cable extending through said pothead and adapted to be electrically connected in circuit to an outlet by said switch mechanism, and means for connecting said cable to said outlet around the switch circuit.

2. In control mechanism for a system of distribution, the combination of a casing, a control switch mounted in said casing, a pothead removably secured to said casing, a cable extending through said pothead and adapted to be electrically connected in circuit with said switch, an outlet, and a switch link mounted in said casing for controlling a circuit connection between said cable and said switch, and said switch and said outlet.

3. In control mechanism for a system of distribution, the combination of a casing, a main switch mounted in said casing, inlet and outlet means, and switch links mounted in said casing and being electrically associated with said main control switch and said inlet and outlet means.

4. In control mechanism for a system of distribution, the combination of a casing, outlets in said casing, a main switch for controlling circuits mounted in said casing, switch links mounted in said casing and each being electrically associated with said main control switch and an outlet, potheads removably secured to said casing, cables extending through said potheads for supplying current through connections controlled by said switch and switch links to said outlets.

5. In control mechanism for a system of distribution, the combination of a casing, inlets and outlets in said casing, circuit control mechanism mounted in said casing, and electric disconnect members mounted on said casing and each being electrically associated with said switch mechanism and said inlets and outlets.

6. In control mechanism for a system of distribution, the combination of a casing, circuit control mechanism mounted in said casing, electric disconnect members mounted on said casing and being electrically associated with said circuit control mechanism, a pothead leading to said casing, and a cable mounted in said pothead having inlets each carrying current to circuits including said disconnect members and controlled within said casing for supplying current to outlets, said outlets being electrically connected to said disconnect members.

7. In control mechanism for a system of distribution, the combination of a casing including a supporting member, a control switch supported by said member, an oil tank for said switch removably secured to said casing, cable enclosing potheads removably secured to said casing, and removable means disposed adjacent each pothead for providing a control opening for disconnect members associated with said switch and cable of each pothead.

8. In control mechanism for a system of distribution, the combination of a casing having upper and lower compartments, a control switch mounted wholly in said lower compartment, other circuit controlling mechanism mounted in the upper compartment, and electrical disconnect members carried by said casing electrically associated with said mechanism mounted in said upper compartment and with inlet and outlet connections therein.

9. In control mechanism for a system of distribution, the combination of a casing having upper and lower compartments, a main control switch mounted wholly in said lower compartment, auxiliary circuit controlling mechanism mounted in the upper compartment, and electrical disconnect members carried by said casing electrically associated with said mechanism mounted in said upper compartment.

10. In control mechanism for a system of distribution, the combination of a casing including a supporting member, a switch carried by said supporting member, an oil tank for said switch removably secured to a portion of said casing and forming another part of said casing, removable switch links mounted in said casing, electrical disconnects carried by a portion of said casing and being electrically associated with said switch links, members forming a part of said casing and enclosing said switch links, potheads leading to said casing, and cables extending through said potheads and being electrically associated with each of said switch links.

11. In control mechanism for a system of distribution, the combination of a casing including a supporting member, a main control switch member carried by said supporting member, insulating bushings carried by said supporting member, conductors extending through said bushings and terminating in switch members for cooperating with said main control switch member, switch links mounted in said casing and electrically associated with said conductors, potheads leading to said casing, and cables extending through said potheads and electrically associated with each of said switch links.

12. In control mechanism for a system of distribution, the combination of a casing including a supporting member, a main control switch member carried by said supporting member, insulating bushings carried by said supporting member, conductors extending through said bushings and terminating in switch members for cooperating with said main control switch member, switch links mounted in said casing and electrically associated with said conductors, potheads leading to said casing, cables extending through said potheads and electrically associated with said switch links, and electrical disconnects carried by said casing and being electrically associated with said switch links.

13. In a device of the character described, the combination of a casing, inlet leads to said casing, disconnect members in said casing adapted to connect inlet and switch contacts and different switch contacts and outlet contacts, and switch members for electrically connecting said switch contacts.

14. In a device of the character described, the combination of a casing, an oil reservoir below said casing, bushings in said casing leading to said reservoir, switch contacts extending through said bushings, a switch in said reservoir to electrically connect pairs of said contacts and disconnect means in said casing each electrically connecting inlet leads and switch contacts and other switch contacts and outlet leads.

15. In a device of the character described, the combination of a casing, switch contacts, a switch for electrically connecting pairs of said contacts, removable disconnect means in said casing each electrically connecting inlet leads and switch contacts and other switch contacts and outlet leads, and means for connecting said inlet leads to said outlet leads to form a circuit around the switch connections.

16. In a device of the character described, the combination of a casing, switch contacts, a switch for electrically connecting pairs of said contacts, removable disconnect means in said casing each electrically connecting inlet leads and switch contacts and other switch contacts and outlet leads, and members adapted to connect said inlet leads to said outlet leads to form a circuit around the switch connections, and means for preventing removal of said disconnect means until said members have formed an electrical connection between said inlet and outlet leads.

Signed at Chicago, Illinois, this 22nd day of March, 1926.

PAUL F. WILLIAMS.